(12) United States Patent　　(10) Patent No.: US 12,617,430 B2

Bailey et al.　　(45) Date of Patent: May 5, 2026

(54) METHOD AND APPARATUS FOR TRAJECTORY SHAPE GENERATION FOR AUTONOMOUS VEHICLES

(71) Applicant: Lit Motors Corporation, Portland, OR (US)

(72) Inventors: David Arthur Bailey, Glendale, AZ (US); Daniel Kee Young Kim, San Francisco, CA (US)

(73) Assignee: Lit Motors Corporation, Portland, OR (US)

( * ) Notice: Subject to any disclaimer, the term of this patent is extended or adjusted under 35 U.S.C. 154(b) by 152 days.

(21) Appl. No.: 17/617,557

(22) PCT Filed: Jun. 10, 2020

(86) PCT No.: PCT/US2020/037091

§ 371 (c)(1),
(2) Date: Dec. 8, 2021

(87) PCT Pub. No.: WO2020/252090

PCT Pub. Date: Dec. 17, 2020

(65) Prior Publication Data

US 2022/0348226 A1　　Nov. 3, 2022

Related U.S. Application Data

(60) Provisional application No. 62/859,649, filed on Jun. 10, 2019.

(51) Int. Cl.
*B60W 60/00*　　(2020.01)
(52) U.S. Cl.
CPC ... *B60W 60/0013* (2020.02); *B60W 2520/125* (2013.01); *B60W 2556/40* (2020.02);
(Continued)

(58) Field of Classification Search
CPC ....... B60W 60/0013; B60W 2520/125; B60W 2556/40; B60W 2710/20; B60W 2720/01;
(Continued)

(56) References Cited

U.S. PATENT DOCUMENTS 5,694,939 A　　12/1997　Cowings
10,107,635 B2 *　10/2018　Larner ................. G05D 1/0212
(Continued)

FOREIGN PATENT DOCUMENTS

CA　　3141406 A1　　12/2020
CN　　107813820 A　　3/2018
(Continued)

OTHER PUBLICATIONS

Lackner, James R. "Motion sickness: more than nausea and vomiting", Jan. 1, 2014, Experimental Brain Research, 232(8), 2493-2510 (Year: 2014).*

(Continued)

*Primary Examiner* — Hitesh Patel
*Assistant Examiner* — Ashleigh Nicole Turnbaugh
(74) *Attorney, Agent, or Firm* — Elliott, Ostrander & Preston, P.C.

(57)　　ABSTRACT

An apparatus for controlling a direction and speed of travel of an autonomous vehicle or driver assisted autonomous vehicle (AV). A GPS and map module receive a start location and a destination location for the AV and generate a plan to move the AV from the start location to the destination location. A trajectory profile generator module receives the plan and calculates a path to move the AV from the start location to the destination location. A supervisory control module receives the calculated path and selects a speed for the AV based on a geometry of the calculated path, inner ear constraints comprising a level of frequencies in a human's inner ear crossover spectrum and a decay time of inner ear (Continued)

disturbance history, the speed limit, and environmental information. A steering control module receives the calculated path and selected speed and control acceleration of the AV based thereon.

2 Claims, 2 Drawing Sheets

(52) U.S. Cl.
CPC ..... *B60W 2710/20* (2013.01); *B60W 2720/10* (2013.01); *B60W 2720/24* (2013.01)

(58) Field of Classification Search
CPC .. B60W 2720/24; B60W 10/04; B60W 10/20; B60W 30/025; B60W 40/08; B60W 30/12; B60W 30/18145; B60W 30/18163
USPC .......................................................... 701/25
See application file for complete search history.

(56) References Cited

U.S. PATENT DOCUMENTS

| | | | |
|---|---|---|---|
| 2016/0090087 A1 | 3/2016 | Lee | |
| 2018/0052000 A1 | 2/2018 | Larner et al. | |
| 2019/0022347 A1 | 1/2019 | Wan et al. | |
| 2019/0061655 A1 | 2/2019 | Son | |
| 2019/0086925 A1* | 3/2019 | Fan | G05D 1/0088 |
| 2020/0189568 A1* | 6/2020 | Pan | B60W 30/025 |

FOREIGN PATENT DOCUMENTS

| | | |
|---|---|---|
| CN | 109643121 A | 4/2019 |
| CN | 114364592 A | 4/2022 |
| EP | 3980307 A1 | 4/2022 |
| GB | 2567854 A | 5/2019 |
| HK | 620220621218 | 10/2022 |
| IN | 202247000652 | 1/2022 |
| JP | 2007236644 A | 9/2007 |
| JP | 2017027354 A | 2/2017 |
| JP | 2017071369 A | 4/2017 |
| JP | 2017100652 A | 6/2017 |
| JP | 2017134725 A | 8/2017 |
| JP | 2018026986 A | 2/2018 |
| JP | 2018106490 A | 7/2018 |
| JP | 6430087 B1 | 11/2018 |
| JP | 2019026208 A | 2/2019 |
| JP | 2022536743 A | 8/2022 |
| KR | 1020150083354 A | 7/2015 |
| KR | 20220019263 A | 2/2022 |
| WO | 2020252090 A1 | 12/2020 |

OTHER PUBLICATIONS

International Report on Patentability for International Patent Application No. PCT/US20/37091, mailed Dec. 23, 2021, 7 pages.
International Search Report and Written Opinion for International Patent Application No. PCT/US20/37091, mailed Sep. 21, 2020, 10 pages.
Extended European Search Report for EP Patent Application No. 20823265.2, mailed Apr. 25, 2023, 7 pages.
First Examination Report for Indian Patent Application No. 202247000652, mailed Dec. 22, 2023, 6 pages.
First Office Action for China Patent Application No. 202080055833.1, mailed Sep. 21, 2023, 8 pages.
Notice of Reasons for Refusal for Japanese Patent Application No. 2021-573748, mailed Jan. 15, 2024, 6 pages.
Second Office Action for China Patent Application No. 202080055833.1, mailed Apr. 12, 2024, 5 pages.
2nd Office Action for Japanese Patent Application No. 2021-573748, mailed Sep. 2, 2024, 5 pages.
Third Office Action for Chinese Patent Application No. 202080055833.1, mailed Aug. 30, 2024, 5 pages.
Notice of Allowance for Japanese Patent Application No. 2021-573748, mailed Jun. 12, 2025, 2 pages.
Notice of Preliminary Rejection for Korean Patent Application No. 10-2022-7000301, mailed Dec. 19, 2024, 5 pages.
Coldewey, Devin, "Researchers look into keeping autonomous vehicles from becoming mobile vomitoriums," TechCrunch 2019, [retrieved from URL https://techcrunch.com/2019/08/20/researchers-look-into-keeping-autonomousvehicles-from-becoming-mobile-vomitoriums/ on Jan. 21, 2026], 2 pages.
Cowings, Patricia S., et al. "An Evaluation of the Frequency and Severity of Motion Sickness Incidences in Personnel Within the Command and Control Vehicle (C2V)," NASA Technical Reports, Doc. ID 19980011547, Jan. 1998, 28 pages.
Donohew, Barnaby E., et al. "Motion Sickness: Effect of the Frequency of Lateral Oscillation," Aviation, Space, and Environmental Medicine, vol. 75, No. 8 (2004), pp. 649-656.
Golding, J.F., et al. "A Motion Sickness Maximum Around the 0.2 Hz Frequency Range of Horizontal Translation Oscillation," Aviation, Space, and Environmental Medicine, vol. 72, No. 3, Mar. 2001, pp. 188-192.
Notice of Allowance for Korean Patent Application No. 10-2022-7000301, mailed Jan. 2, 2026, 4 pages.

* cited by examiner

100

200

METHOD AND APPARATUS FOR TRAJECTORY SHAPE GENERATION FOR AUTONOMOUS VEHICLES

CLAIM OF PRIORITY

This patent application is related, and claims priority, to provisional patent application No. 62/859,649 filed Jun. 10, 2019, entitled "Optimal Trajectory Shape Generation for the Minimization of Motion Sickness in Autonomous Vehicles", the contents of which are incorporated herein by reference.

TECHNICAL FIELD

Embodiments of the invention relate to autonomous vehicles, in particular, controlling the trajectory of an autonomous vehicle to minimize motion sickness of passengers in the autonomous vehicle.

BACKGROUND

A self-driving car, also known as an autonomous vehicle (AV), a connected and autonomous vehicle (CAV), a driverless car, or a robotic car (robo-car), is a vehicle that is capable of sensing its environment and moving safely with little or no human input. Self-driving cars combine a variety of sensors to perceive their surroundings, such as video, radar, lidar, sonar, GPS, odometry and inertial measurement units. Control systems interpret sensory information to identify appropriate navigation paths, as well as obstacles and relevant signage.

Autonomous vehicles can make their passengers motion sick. Motion sickness has been linked to the frequency, level, and direction of external accelerations imparted upon the passenger, as well as a passenger's lack of anticipation of a maneuver performed by the autonomous vehicle. Part of the passenger's lack of anticipation is based on how an autonomous vehicle performs a maneuver, i.e., the shape of the velocity vs. time graph forming the autonomous vehicle's acceleration and the attitude (i.e., the three-dimensional orientation) of the autonomous vehicle. Time optimal paths and constant curvature turns, both used in autonomous vehicles, are not the way people maneuver vehicles. What is needed is a "passenger comfort" optimal path in which reduced probability of motion sickness is the property to be optimized.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Embodiments of the invention control an autonomous vehicle trajectory and speed to reduce the likelihood of a passenger getting motion sickness. In particular, embodiments of the invention control the transitioning trajectory between the dynamic states of position (direction), velocity and acceleration of the autonomous vehicle. Dynamic states of an autonomous vehicle in this context are constituted by changes in the vehicle's embedded longitudinal axis (back to front), controlled by propulsion and braking, and the vehicle's lateral, or cross, axis, controlled by steering. Multiple interdependent controls for vehicle speed and direction are used to create the desired motion sickness reducing trajectory. Controls include, but are not limited to, controlling the jerk (i.e., the change in acceleration) component of the dynamic states, including lateral and forward motions, within the path constraints of a desired direction of travel.

Figure 2:
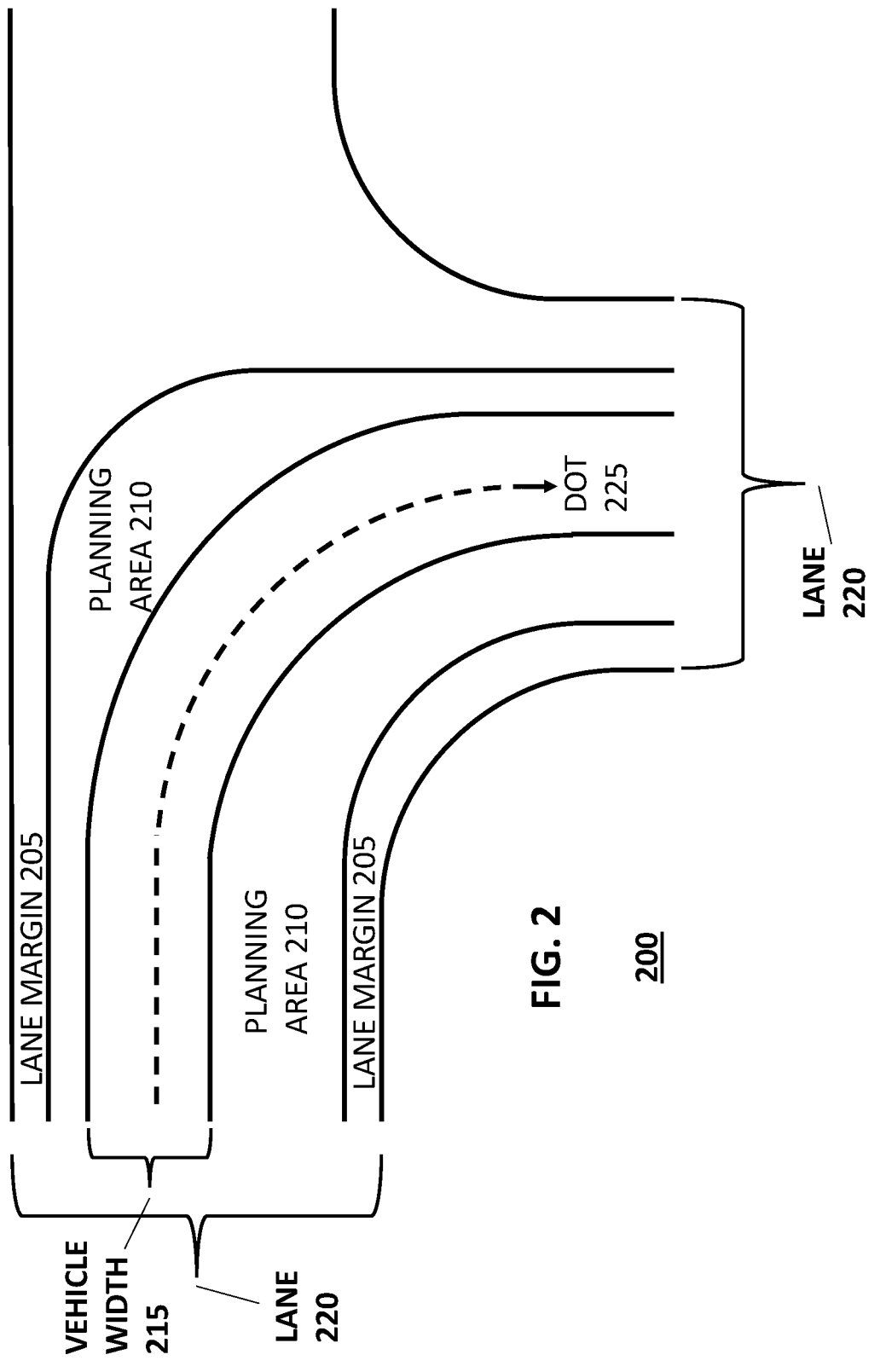
FIG. 2 is a depiction of the geometric constraints used when generating a trajectory.

The speed and direction controls are managed by a supervisory control module that constrains the time-dependent lateral accelerations and jerk in the frequency range that potentially is disturbing to the inner ear of a passenger in the autonomous vehicle. With reference to FIG. 2, examples of autonomous vehicle maneuvers to be controlled in this context include actions such as turning from one street to another or changing from one Lane 220 to another (such as changing lanes or turning from one street to another street). A Lane 220 is defined herein as the width of an area on a road or surface over which an autonomous vehicle can be driven. More broadly a maneuver is any change in course or speed and the trajectory is the path taken between one or both of those states. Embodiments are primarily for autonomous vehicles but may be applicable to driver assisted autonomous vehicles as well.

Figure 1:
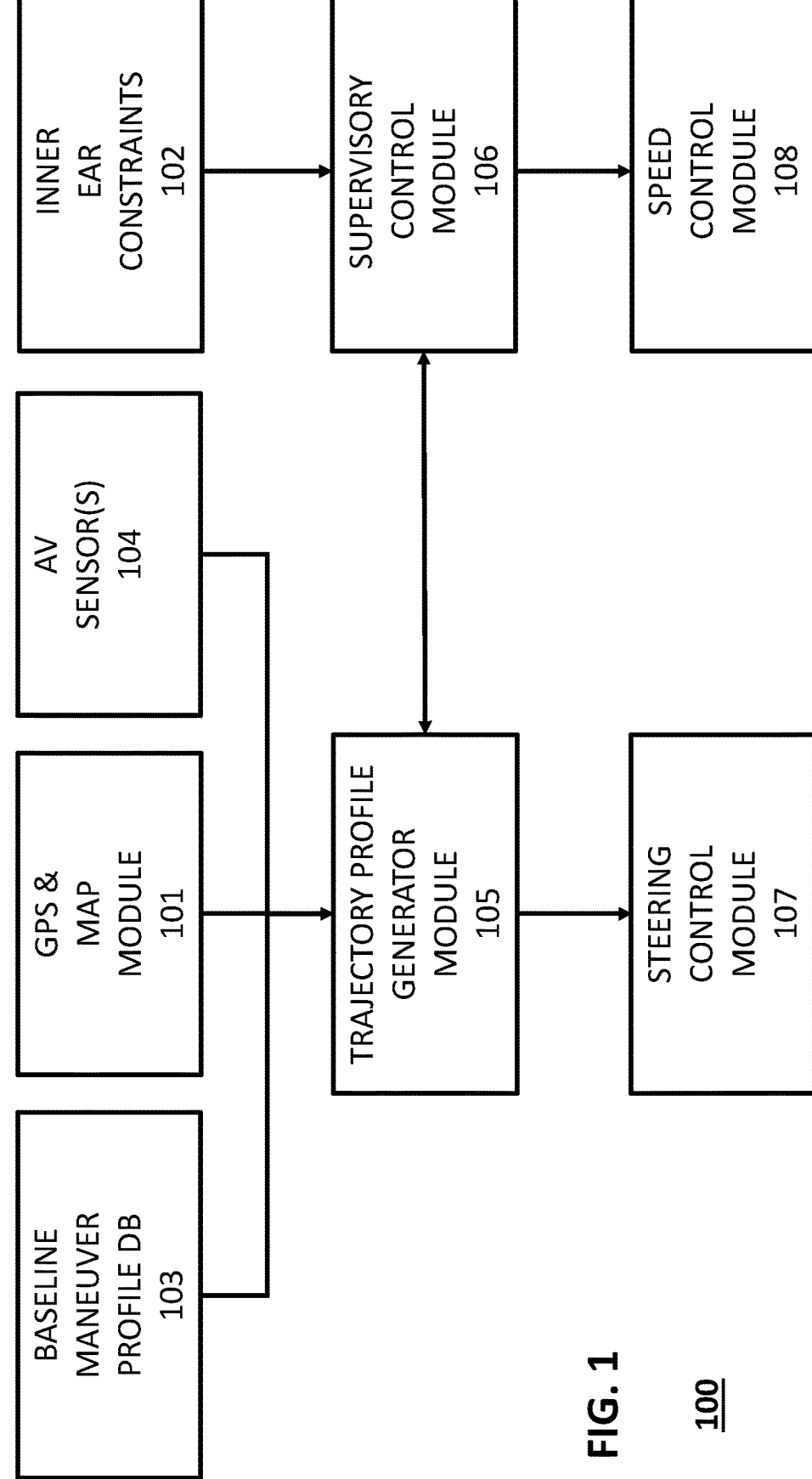
FIG. 1 is a functional block diagram of embodiments of the invention.

With reference to FIG. 1, an embodiment of the invention 100 receives input from three sources: a GPS and map module 101 that provides a current, or a selected or chosen starting location, and a selected destination location, for the autonomous vehicle, with reference to a digitized map; a database of baseline maneuver profiles 103 for the autonomous vehicle, which provides basic information for controlling the direction, speed and acceleration of the autonomous vehicle, for example, for changing lanes, making left or right hand turns, or entering or exiting a freeway; and sensor input 104 from sensors, e.g., forward-looking sensors, and, optionally, lateral-looking sensors, that identify the autonomous vehicle's current lane and turn environment, as well as the autonomous vehicle's proposed lane, if different than the current lane.

Input to the GPS and map module 101 (provided by or for a passenger, for example) includes a starting location or current location (location A) and a destination location (location B) for the autonomous vehicle. The GPS and map module 101 identifies a plan for getting the autonomous vehicle from location A to location B and provides it to a Trajectory Profile Generator Module 105. As the autonomous vehicle travels, the sensors 104, for example, one or more monocular or binocular cameras, a radar, a lidar, a GPS transceiver, or a combination of sensors, sense an approaching turn or identify a possible, proposed, or planned pathway (according to the input received from the GPS and map module 101) or Lane 220, and capture turn and Lane 220 parameters, including the condition of the road, any vehicle congestion or other type of road congestion (pedestrians, bicyclists, road construction, obstructions, signage), and the upcoming turn to be negotiated based on the GPS and map input, and pass this information to the Trajectory Profile Generator Module 105. The maneuver lane requirements from the database of Baseline Maneuver Profiles 103 are also available to the Trajectory Profile Generator Module 105. The Trajectory Profile Generator Module 105 selects a maneuver profile from the database of Baseline Maneuver Profiles 103 and calculates a path with low lateral acceleration, e.g., less than 2 Hz, to accomplish the maneuver. (Keeping the primary acceleration forces in the vertical direction instead of lateral direction with reference to the anatomy of the passenger is accomplished by using coordinated turns as in a two wheeled vehicle, or in an autonomous vehicle that rotates the passenger to keep the sum of gravitational and centrifugal forces aligned so the passenger only experiences vertical sensations).

The calculated path with low lateral acceleration is sent to the Steering Control Module 107 and a Supervisory Control Module 106. The Supervisory Control Module 106 uses the geometry of the path, Inner Ear Constraints 102, a speed limit obtained from the GPS and Map Module 101, and environmental information (e.g., road conditions, traffic congestion) to select a speed for the autonomous vehicle. The speed is transmitted to the Trajectory Profile Generator Module 105 to set a Lane Margin 205 in a subsequent iteration of generating a trajectory for the autonomous vehicle, and to Speed Control Module 108. The Inner Ear Constraints 102 consist of a level of frequencies in the inner ear crossover spectrum and the decay time of disturbance history.

According to one embodiment, an Apriori Trajectory Generator module makes use of a set of tables for placing points between the lane boundaries for total turn angle ranges. These data are generated based on autonomous vehicle design in the development phase of the system design, and includes a percentage of progress through a turn when the number of defining points changes from 3 to 2.

According to an embodiment 200, the direction of travel, or direction of turn, (DOT) 225 and Lane 220 parameters depicted in FIG. 2 include the Lane 220 and a trajectory of a center of a Planning Area 210 or desired pathway, if a Planning Area exists. The Planning Area 210 is defined herein as the width of Lane 220 less a width of a Lane Margin 205 (one or both a left and right lane margins, if they exist), and less a width of the autonomous vehicle ("the Vehicle Width 215"). The Lane Margin 205 is defined herein as a safety barrier between the furthest maneuvering of the vehicle and an edge of the Lane 220. The Lane Margin 205 is a function of vehicle velocity and Lane 220. The Planning Area 210 is the range of pathway that the Trajectory Profile Generator Module 105 can use to design a path for the autonomous vehicle to travel with lowest inner ear disturbance, or at least to travel with inner ear disturbance maintained below a threshold that is understood to cause motion sickness. The inner ear disturbance is a function of the path design and the vehicle velocity. When driving an autonomous vehicle on narrow roads, the Planning Area 210 may diminish to zero and the only parameter available to control lateral accelerations is autonomous vehicle speed.

Note the Planning Area 210 can reduce to a line if the width of Lane 220 reduces in width to less than two times the width of the Lane Margin 205 and the autonomous Vehicle Width 215. Furthermore, the Planning Area 210 may reach an endpoint if the width of Lane 220 reduces to less than the Vehicle Width 215. Vehicle Width 215 is defined herein as the cross section of the vehicle orthogonal to its velocity vector relative to the Lane 220 and is a parameter of the vehicle build and attitude. Vehicle Width 215 determines the limiting distance at which the center of the generated trajectory may approach the inside edge of the Lane Margin 205. Generated trajectory is defined herein as a path that meets the geometric planning constraints and reduces or minimizes the probability of motion sickness.

The Vehicle Width 215 of a two-wheeled autonomous vehicle may vary with attitude unless it is spherical, i.e., a leaning two wheel vehicle is wider than an upright one. The Lane 220, along with the Vehicle Width 215 and Lane Margin 205 requirements are used to calculate the Planning Area 210. The Lane Margin 205 is defined herein as a part of the Lane 220 at the edge(s) of the Lane 220. The Lane 220 less the Lane Margin 205 (on one or both sides of the Lane 220) defines the Planning Area 210. The Planning Area 210 provides the range of freedom to vary the trajectory of the autonomous vehicle from the center of the Lane 220.

The Lane Margin 205 requirement is a distance the vehicle must stay from a Lane 220 edge or boundary (either a left edge, or a right edge, a Lane boundary, or both Lane boundaries). According to embodiments, the Lane Margin 205 requirement varies with the width of Lane 220 width and vehicle speed. A wider Lane 220 invites or allows for a larger Lane Margin 205 requirement. The higher the autonomous vehicle's speed, the greater the Lane Margin 205 requirement because corrective actions require larger margins at higher speeds, thus producing higher accelerations.

According to embodiments of the invention, there are two basic types of maneuvers: changing destination, including changing lanes, selecting a direction at an intersection, transitioning from one freeway to another freeway, and exiting or entering a freeway; and following a curved road. A road with an occasional turn, curve, or lane change, can be addressed more aggressively because motion sickness is an accumulative condition. The history of induced accelerations fades with time. However, driving on a mountain road with many curves may require reducing speed to stretch out the acceleration events and also to reduce the amplitude of the lateral acceleration (i.e., the maximum lateral acceleration of the autonomous vehicle).

These factors require a two level path planning method, as follows. Each lateral acceleration event that results in low frequency lateral accelerations (below 2 Hz) and with an amplitude of lateral acceleration above the human sensitivity is recorded along with its severity. A time weighted severity sum is used in setting lateral acceleration levels for an upcoming maneuver or planned path.

The planned trajectories are designed to minimize and smooth the rate of curvature of the autonomous vehicle as it travels along the trajectories. One embodiment generates a curve between the existing position and direction of the autonomous vehicle, and the desired position and direction of the autonomous vehicle, that has C3 characteristics or greater. That is, at a minimum, the first derivative of curvature is a continuous function. Further, the second derivative of curvature may also be limited in absolute magnitude. Continuity on the first derivative of curvature (a C3 position curve) of the path lowers the frequency content of the accelerations the passenger is feeling and further reduces motion sickness. Smoothness of the lateral acceleration is achieved by using at least a C3 (continuous third derivative) curve for the path.

An example of a method to generate a curve with two continuous derivatives (C2) is to use a cubic spline follows:

$$P = A + Bt\ Ct^2 + Dt^3$$

However, the path is generated by using two curves, one in x and one in y. Plotting the curve in the x-y Lane provides the path of the turn. The first derivative of the composite curve generated direction, and the first derivative of direction along with the wheelbase of the vehicle gives curvature. A passenger in the autonomous vehicle desires a smooth curvature, meaning at least the first derivative of curvature is smooth. This requires a path that at least has three continuous derivatives or a C3 curve. This can be generated by using a 4th order spline as follows:

$$P = A + Bt + Ct^2 + Dt^3 + Et^4$$

or a similar curve, e.g., $$P_x = A_x + B_x t + C_x t^2 + D_x t^3 + E_x t^4 + \ldots$$

and $$P_y = A_y + B_y t + C_y t^2 + D_y t^3 + E_y t^4 + \ldots$$

It is further appreciated that embodiments of the invention may make use of C3 or higher curves other than splines, including versine generated curves, etc.

A straight 4th order spline can be used, according to an embodiment, but the process of starting with a three point 4th order spline and using the slope of the two parametric curves with a slight modification to generate a 4 point 4th order spline reduces the total curvature and the lateral acceleration the passenger experiences.

The two curves generated are:

$$P_x(t) \text{ and } P_y(t),$$

the parameter t is the distance along the path. The calculation of the coefficients is left to one skilled in the art to perform. The direction and curvature are derived from the $P_x(t)$ and $P_y(t)$ as follows:

$$\text{Direction}(t) = \tan^{-1}\left(\frac{\dot{P}_y(t)}{\dot{P}_x(t)}\right)$$

and $$\text{curvature }(t) = \frac{d}{dt}\text{ Direction }(t).$$

The amplitude of curvature is used to calculate a bounding value of speed to keep the lateral acceleration below a maximum acceleration determined from motion sickness sensitivity.

According to embodiments of the invention, changes in velocity are controlled in a similar manner as described above regarding changes in curvature of the autonomous vehicle. The embodiment further generates a jerk (first derivative of lateral acceleration) function that is continuous.

If the autonomous vehicle has just two wheels, in line, there is a further reduction in motion sickness. People are less susceptible to vertical accelerations than lateral accelerations. Two wheeled vehicles have coordinated turns to maintain balance. This reduces or eliminates the lateral acceleration on the human sensory receptors, allowing a two wheeled vehicle to travel faster along a desired path at the same level of motion sickness sensitivity. Above, it was noted above that the width of Lane 220 along with the Vehicle Width 215 and the Lane Margin 205 requirements are used to calculate the Planning Area 210, i.e., the range of freedom to vary the trajectory from the center of the Lane 220. When embodiments of the invention are applied to a two-wheeled vehicle, the Vehicle Width 215 is less than a four-wheeled vehicle, thus the Planning Area 210 is greater.

If the autonomous vehicle is being used as an autonomous taxi, the motion sickness level should be set at a 10 percentile level (in a given environment, a certain percentage of passengers will get motion sickness), and if it is used as a personal autonomous vehicle the level could be set at the percentile level for the passenger using the vehicle, for example, by turning a knob or touch screen or otherwise selecting between comfort, sport, or race-track, modes of driving. The higher the passenger's resistance to motion sickness the faster the passenger can traverse a path to their desired destination.

The invention claimed is:

1. An apparatus for controlling a direction and speed of travel of an autonomous vehicle or driver assisted autonomous vehicle (AV), comprising:

a GPS and map module configured to receive a start location and a destination location for the AV, and a speed limit, and generate a plan for moving the vehicle from the start location to the destination location;

a trajectory profile generator module configured to receive the plan and calculate in real-time a path including a sequence of changes in course or speed of the vehicle to move the vehicle from the start location to the destination location, wherein to calculate the path in real-time comprises:

tracking each lateral acceleration event with an amplitude above a human sensitivity level, and a corresponding severity;

calculating a time weighted severity sum based on the corresponding severity of the tracked lateral acceleration events; and selecting a lateral acceleration level below a maximum lateral acceleration level that can induce motion sickness in a human for an upcoming one of the sequence of changes in course or speed of the vehicle based on the time weighted severity sum;

a supervisory control module configured to receive the calculated path and the selected lateral acceleration level and select a speed for the AV based on a geometry of the calculated path, the selected lateral acceleration level, inner ear constraints comprising a level of frequencies in a human's inner ear crossover spectrum and a decay time of inner ear disturbance history, the speed limit, and environmental information; and a steering control module configured to receive the calculated path and the selected speed and control a lateral acceleration and a change in lateral acceleration of the vehicle based on the calculated path and the selected speed.

2. The apparatus of claim 1, wherein the trajectory profile generator module configured to receive the plan and calculate in real-time the path including the sequence of changes in course or speed of the vehicle to move the vehicle from the start location to the destination location, comprises the trajectory profile generator module configured to generate a curve that has C3 characteristics or greater.

\* \* \* \* \*